Inventor
KLAUS L. HANSEN

By Arthur R. Woolfolk
Attorney

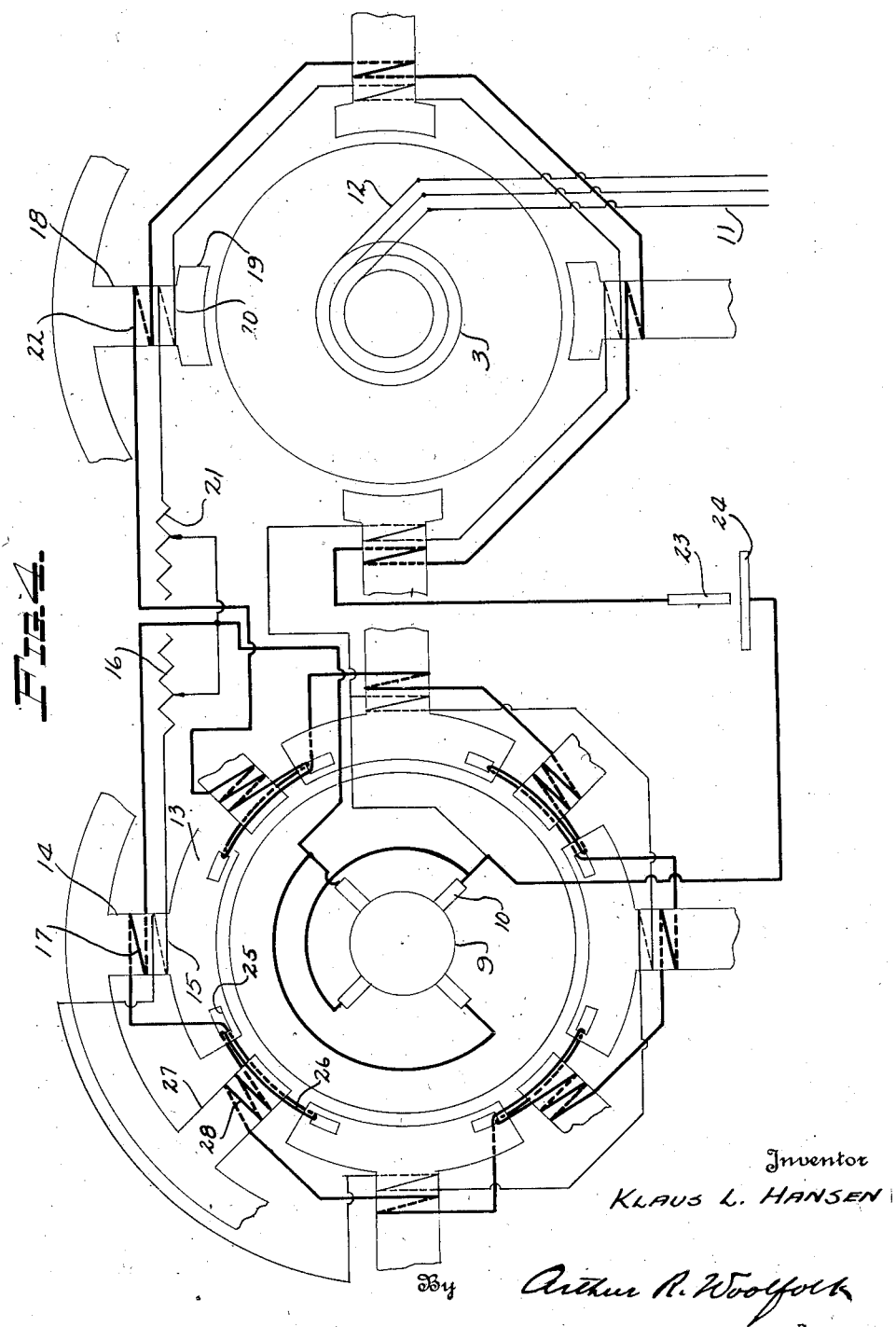

Patented June 23, 1931

1,811,670

UNITED STATES PATENT OFFICE

KLAUS L. HANSEN, OF MILWAUKEE, WISCONSIN

DYNAMO ELECTRIC MACHINE

Application filed January 26, 1929. Serial No. 335,179.

This invention relates to dynamo electric machines and is particularly directed to a machine adapted to convert electrical energy from A. C. to D. C.

Various methods have been employed for effecting this conversion, and they may be roughly grouped as a synchronous converter, a dynamotor, a motor generator, and a motor-converter.

While a synchronous converter has a low first cost, high efficiency, and low resistance loss, it, nevertheless, has an approximately fixed ratio of A. C. voltage to D. C. voltage. Even if the D. C. voltage is varied through a small range, the power factor is varied, which is obviously a disadvantage.

With a dynamotor, two distinct windings on the armature are required, and this not only adds to the cost of manufacture, but increases the resistance loss. Further, the D. C. voltage can be varied only through a limited range, and when so varied, alters the power factor.

While the D. C. voltage may be controlled with a motor generator set, there is a relatively high loss, due to the fact that two distinct machines are employed, and also the initial expense is considerably higher than with the other types of machines mentioned.

The motor converter, or as it is sometimes called, the cascade-converter, is a two-machine structure. One of the machines consists of a stator similar to the stator of an induction motor and cooperating with a wound rotor, the stator being the primary and the rotor being the secondary. The other machine has a stationary D. C. field structure cooperating with a rotor which is constructed in a manner identically similar to the armature of a rotary converter, such rotor being the primary with reference to the incoming A. C. energy supply. The frequency of the alternating current supplied the rotor of the second machine is always less than line frequency.

The motor-converter shares with the dynamotor the lack of flexibility in varying the D. C. voltage without disturbing the power factor at the A. C. terminals.

In many cases, it is desirable to have a variable D. C. voltage, as for example, in the Ward-Leonard system, arc welding, and other applications.

This invention is designed to overcome the defects of the machines as noted above, and objects of this invention are to provide a machine for converting electrical energy from A. C. to D. C. in a novel manner to secure the advantages of both the synchronous converter and the motor generator, while avoiding their disadvantages.

Further objects of this invention are to provide a machine for converting electrical energy from A. C. to D. C., which is so constructed that the machine may readily be designed to provide a normal D. C. voltage equal to, greater, or less than that of the A. C. supply; in which the D. C. voltage may be varied through any range desired without altering the power factor; in which a part of the machine acts, not only as a synchronous motor, but also as a transformer which may have any ratio desired between its primary and secondary windings; in which the winding of the D. C. machine is continued into the A. C. machine and forms, not only the winding of the D. C. machine, but also the secondary of the A. C. machine, so that one part of the winding acts as the winding of a D. C. generator and the other part of the winding acts as the secondary of the A. C. machine, the fields in which these parts of the winding operate being independent and separately controlled, so that the fields may be related in different manners to the varying load which the machine supplies.

Further objects of this invention are to provide a machine in which the same winding extends through both the armatures of the D. C. and A. C. machines, and thus the effect is substantially that of a rotary converter having a very large number of phases irrespective of the number of phases of the A. C. supply; and in which both a D. C. voltage control and a power factor control are secured in a manner such that each is independent of the other.

Further objects are to provide a novel form of dynamo electric machine which has a synchronous motor provided with a primary winding, and which has a direct current dynamo provided with a winding which also constitutes a secondary winding associated with the primary winding of the synchronous motor, so that both the converter action and the direct current dynamo action take place and are jointly effective in producing the terminal D. C. voltage; in which the frequency impressed upon the rotor of the D. C. machine is the line frequency; and in which the winding common to both rotors operates in two different fields which may be independently controlled, which may be differently designed to have different characteristics, and which may vary in different ways from each other for variations in the load, so that distinct and separate control of the D. C. and A. C. portions of the machine may be secured.

Further objects are to provide a machine in which the major portion of the energy from the A. C. machine is transmitted electrically to the D. C. machine through the winding common to both machines; in which the shaft transmits only a slight torque; in which the winding common to both machines has a part located in the same slots with the primary winding of the synchronous motor; and in which the field of the A. C. machine increases slightly with increase of load to maintain a substantially constant, predetermined power factor.

Further objects are to provide a machine which has a drooping external characteristic curve; which may have its open circuit voltage set at any desired predetermined value; and in which a high impedance is inherently secured in the windings of the D. C. machine to prevent momentary, large currents when the external resistance of the work circuit fluctuates rapidly, as in arc welding, to thereby secure a stable arc.

Further objects are to provide a dynamo electric machine in which a high impedance is secured in the armature structure of the machine itself, due to the fact that the D. C. machine has a large armature reaction, in which this effect is combined with the bucking series field on the D. C. machine to produce a rapidly drooping characteristic, and in which no stabilizing devices are needed.

Further objects are to provide a dynamo electric machine which is suitable for any system where a variable voltage is desired, and which is particularly suitable for arc welding, as its characteristics, which may be controlled, are such that any desired open circuit voltage may be obtained, and also a predetermined short circuit current may be obtained.

Further objects are to provide a dynamo electric machine which has a relatively low initial cost, which has a high efficiency, and which is most easily controlled to produce any desired open circuit voltage, short circuit current, or power factor.

An embodiment of the invention is shown in the accompanying drawings, in which:—

Figure 4 is a diagrammatic view showing the connections of the field windings and the field structure of the two machines and the supply and work circuits.

Figure 1:
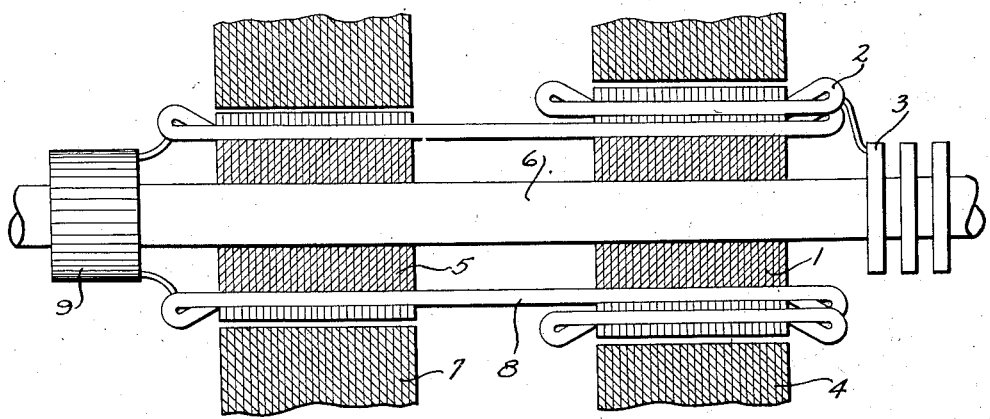
Figure 1 is a fragmentary sectional view through the rotors of the dynamo electric machine, and showing a portion of the stators.

Referring to the drawings, it will be seen that the dynamo electric machine comprises a synchronous motor or A. C. machine having a wound rotor 1 whose primary windings 2 are connected to slip rings 3. The rotor cooperates with the field structure or stator 4, a portion of which is shown in Figure 1. The D. C. machine or dynamo comprises a rotor 5 mounted upon the same shaft 6 as the rotor 1 of the A. C. machine and cooperating with the field structure or stator 7, a portion of which is shown in Figure 1.

Figure 2:
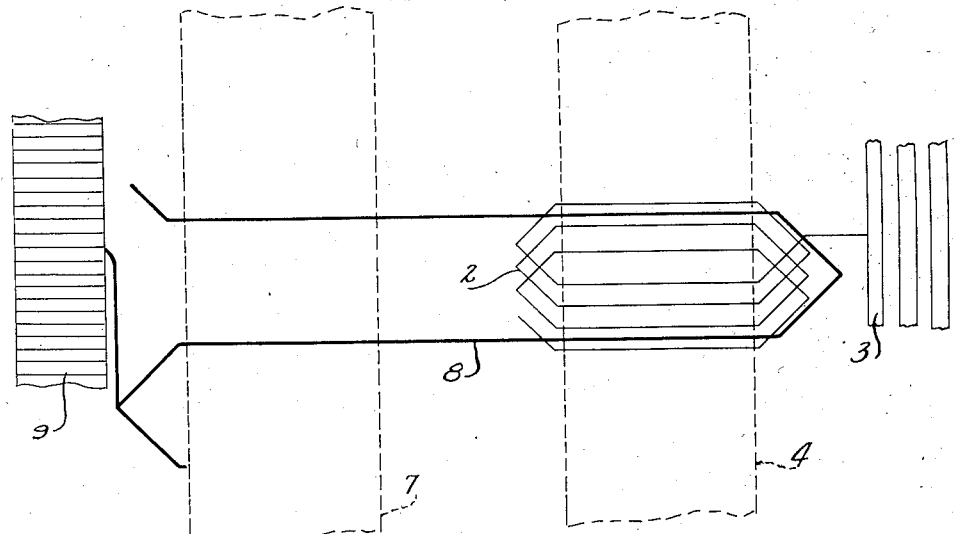
Figure 2 is a diagrammatic view in which the windings of the rotors are shown developed.
Figure 3:
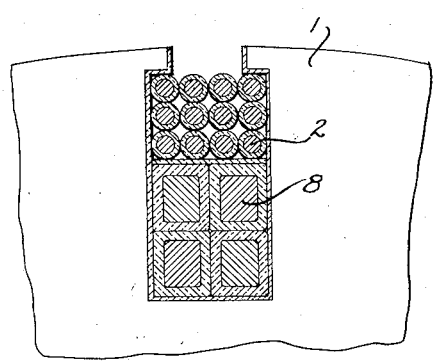
Figure 3 is a fragmentary sectional view through the rotor of the A. C. machine.

A common winding 8 is provided for the two machines and extends through the rotors of each machine, as shown in Figures 1 and 2. This winding has a portion carried by the rotor or armature of the D. C. machine and a portion by the rotor of the A. C. machine, such latter portion constituting a secondary winding and being placed in the same slots with, and closely adjacent, the primary winding 2. The association of the windings 2 and 8 is shown in Figures 2 and 3, and from the latter figure it will be seen that these windings are very closely coupled, so that the major part of the magnetic effect of the current in the primary winding is neutralized by the current flowing in the secondary winding. At regular intervals the winding 8 is connected to the commutator 9 of the D. C. machine.

From the description thus far given, it will be seen that the line frequency is directly generated in the windings of the rotor of the D. C. machine. Further, any voltage ratio may be secured between the primary and secondary windings 2 and 8. As shown in Figure 3, a step down ratio is indicated, although obviously the ratio could be anything desired.

The current is taken from the commutator of the D. C. machine by means of a plurality of brushes 10 connected in groups, as indicated in Figure 4.

The supply mains for the alternating current are indicated in Figure 4 by the reference character 11 and are connected to brushes 12, which bear upon the slip rings 3.

The field structure of the D. C. machine may comprise a plurality of poles which have relatively wide pole faces 13 as compared with the necks or cores 14. These cores are each provided with a shunt winding 15, which may be connected in series and through a rheostat 16 to the groups of brushes 10, so that the field strength may be controlled. The cores 14 are further provided with series windings 17, which oppose the effect of the windings 15 and when the load reaches a predetermined point, depending upon the design of the machine and the setting of the rheostat 16, neutralize the effect of the windings 15. When the load delivered by the apparatus increases beyond the predetermined point, the E. M. F. generated in the armature windings of the D. C. machine is reversed and in opposition to that from the secondary of the A. C. machine. This produces a rapidly drooping characteristic and is one of the factors limiting the short circuit current to a predetermined value.

The pole faces 13 are preferably provided with apertures 25 adjacent their ends through which the series winding passes as indicated at 26. The winding 26 constitutes an inductance increasing winding. Also interpoles 27 are provided and may be equipped with series windings 28, although the windings 26 surround the interpoles and, in certain cases, are sufficient without requiring a separate interpole winding.

The field structure of the A. C. machine may comprise a plurality of cores or field poles 18, which may be provided with the usual pole faces 19. These field poles are provided with shunt windings 20, which are connected through a rheostat 21 to the groups of brushes 10 of the D. C. machine. It is preferable to provide a series winding 22 for each of the field poles. The shunt and series windings are cumulative in their action. The series winding is connected directly in series with the series winding 17 of the D. C. machine. The purpose of the series winding for the A. C. machine is to slightly increase the field as the load increases, so as to maintain the power factor at a predetermined value for which the machine is designed, a further control of the power factor being through the medium of the rheostat 21.

The work circuit is indicated as comprising an electrode 23 and the work 24 between which an arc is maintained when the machine is used for arc welding.

The winding of the D. C. machine is such that a large reactance is obtained. The purpose of this relatively large reactance is to suppress momentary large surge currents in the winding 8 even when the resistance of the arc fluctuates rapidly. Further than this, the series fields, the windings 26, and, to a lesser extent, the windings 28, tend to stabilize the arc and prevent excessive currents.

It is to be noted also that the bucking or differential series field 17 of the D. C. machine neutralizes the effect of the shunt winding of the D. C. machine when a predetermined current flows in the work circuit. Thus the E. M. F. generated by the D. C. machine drops to zero at this point. A further increase in current in the work circuit causes the series field of the D. C. machine to predominate and a reverse E. M. F. is generated in the portion of the winding 8 cutting the field of the D. C. machine. This E. M. F. is opposed to that generated by the portion of the winding 8 carried by the armature of the A. C. machine. Clearly, therefore, a rapidly drooping characteristic is obtained and, in addition, the machine is protected from excessive currents even of momentary or brief duration. Further than this, as previously stated, the pronounced armature reaction of the D. C. machine is also a factor aiding in the attainment of this rapidly drooping characteristic.

Also it is to be noted that the primary and secondary winding on the rotor of the A. C. machine have a true transformer action and are closely coupled, so that the current in the secondary tends to neutralize to a major extent the effect produced by the current in the primary. In addition to this, the portion of the winding 8 carried by the rotor of the A. C. machine rotates in a stationary field. Further, it is apparent that any transformer ratio may be obtained by the winding 2 and the winding 8, so that it is a relatively easy matter to design this machine for any desired relative open circuit voltage.

In addition to this, there is great flexibility provided for voltage control of the D. C. machine. It does not have the fixed voltage ratio of the usual rotary converter. It is, therefore, free both from this fixed voltage ratio and also from the majority of losses in a D. C. dynamo of the same capacity.

In addition to these points, it is to be noted particularly that the power factor control is wholly independent of the output voltage control. One may be varied without affecting the other.

It is to be distinctly understood that although the fields of the two machines have been shown as stationary, obviously they could be made rotating and the armature structure of each machine could be made as the stator.

It is also apparent that the open circuit voltage of the machine as a whole can be predetermined by the setting of the rheostat for the direct current machine, and also by the design of the machine itself. Thus a great range in open circuit or no load voltage may be obtained.

Further, it is apparent from the construction described and illustrated that the short circuit current may be held at any predetermined value. Also no stabilizing device is required and, consequently, the construction is vastly simplified and the cost is materially reduced.

It will be seen, therefore, that a novel form of dynamo electric machine has been produced by this invention which is of relatively simply construction, which may be made by the ordinary practice in dynamo construction without requiring elaborate operations for its assembly. It will be seen further that the machine is self-contained and requires no external apparatus in order to adapt it for the widely varying demands as in arc welding.

It will be seen further that the utmost flexibility is afforded by this construction, and that no step-down transformers or other auxiliary equipment is required although there may be a relatively great change in voltage from the supply mains to the delivery circuit. This change in voltage is readily secured by the proper design of the machine and, as stated, without auxiliary apparatus.

The term armature is intended to cover either a rotor or a stator.

Although the invention has been described in considerable detail, such description is intended as illustrative rather than limiting, as the invention may be variously embodied and as the scope of such invention is to be determined as claimed.

I claim:—

1. In a dynamo electric machine, the combination of two rotors, one of said rotors being a driving rotor and having an alternating current winding thereon, the other of said rotors being a generator rotor, slip rings connected to said winding, a winding carried jointly by said rotors, a commutator connected to said last mentioned winding, brushes bearing upon said commutator, a field structure for each of said rotors, the field structure for said generator rotor having a shunt winding and a differential series winding thereon, the other of said field structures having a shunt winding and a cumulative series winding.

2. In a dynamo electric machine, the combination of a direct current machine having a rotor, a commutator, and a field structure; an alternating current machine having a rotor, slip rings, and a field structure; brushes bearing upon said commutator and adapted to be connected to a work circuit; brushes bearing upon said slip rings and adapted to be connected to alternating current supply mains; a winding common to both rotors and connected to said commutator; a winding carried by the rotor of said alternating current machine and connected to said slip rings; shunt windings for said field structures connected to the first mentioned brushes; and a cumulative series winding for the field structure of said alternating current machine.

In testimony whereof, the signature of the inventor is affixed hereto.

KLAUS L. HANSEN.